United States Patent [19]

Geschwender et al.

[11] Patent Number: 5,105,757
[45] Date of Patent: Apr. 21, 1992

[54] WATER GAUGE AND METHOD OF USE THEREFOR

[75] Inventors: Robert C. Geschwender, 3855 Orchard St., Lincoln, Nebr. 68503; Mark T. Straub, Omaha, Nebr.

[73] Assignee: Robert C. Geschwender, Lincoln, Nebr.

[21] Appl. No.: 565,054

[22] Filed: Aug. 9, 1990

[51] Int. Cl.[5] .............................................. G01F 23/30
[52] U.S. Cl. ..................................... 116/228; 116/215
[58] Field of Search ................. 73/171, 305, 311, 314, 73/315, 319, 322.5; 116/215, 228, 264, 273, 274

[56] References Cited

U.S. PATENT DOCUMENTS

| | | | |
|---|---|---|---|
| 1,714,733 | 5/1929 | Shank | 73/322.5 |
| 1,727,525 | 9/1929 | Thompson et al. | 73/322.5 |
| 2,339,922 | 1/1944 | Gatewood | 73/305 |
| 2,371,511 | 3/1945 | Faus | 116/228 |
| 3,152,572 | 10/1964 | Allhoff, Jr. | 116/228 |
| 3,526,201 | 9/1970 | Larson | 116/215 |

FOREIGN PATENT DOCUMENTS 0610966 2/1935 Fed. Rep. of Germany ..... 73/322.5

Primary Examiner—William A. Cuchlinski, Jr.
Assistant Examiner—W. Morris Worth
Attorney, Agent, or Firm—Vincent L. Carney

[57] ABSTRACT

A water gauge in accordance with the invention includes a base and a spherical indicator ball. The base includes a container having a side wall, a bottom wall and a post. The spherical indicator ball has a yellow initial signal hemispherical wall and a red final signal hemispherical wall connected to an axle along a circumference. The axle is supported by the side wall of the container. The yellow initial signal hemispherical wall is heavier than the red final signal hemispherical wall. The spherical indicator ball has a channel in the middle of the red final signal hemispherical wall. Initially, the post is positioned into the channel so that the yellow initial signal hemispherical wall is up and visible. The water gauge is positioned on a lawn to be watered. When watering has added a sufficient amount of water to the container to float the ball above the top of the post, the ball is rotated by gravitational force to position the heavier hemispherical wall in the water. Thus, the water gauge is adapted to indicate when water droplets falling onto a lawn have reached a predetermined amount.

14 Claims, 7 Drawing Sheets

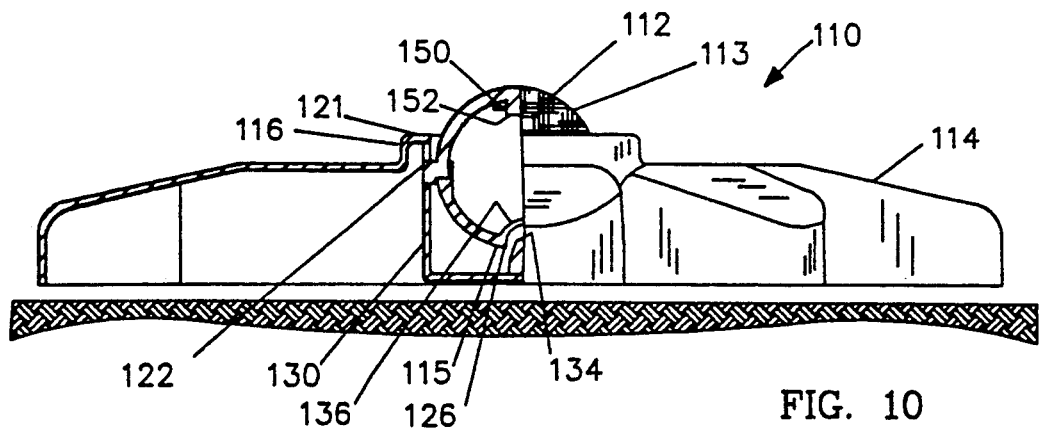
FIG. 10
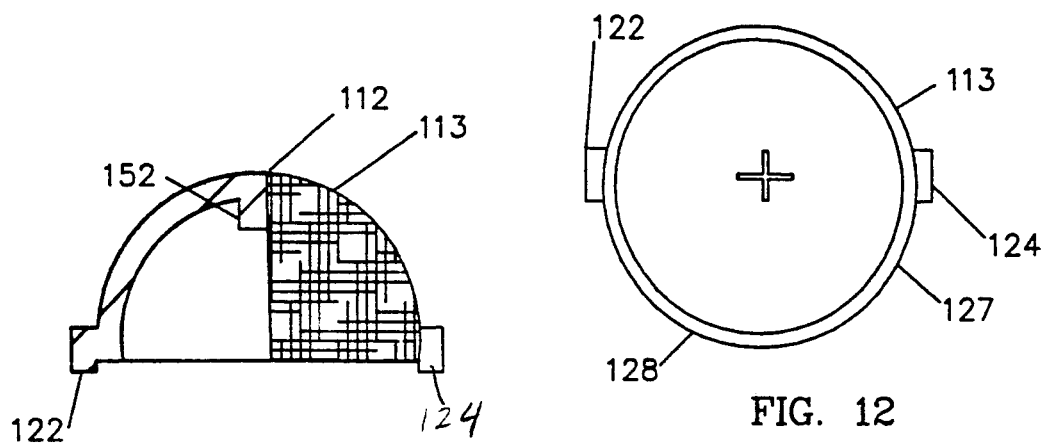
FIG. 11
FIG. 12
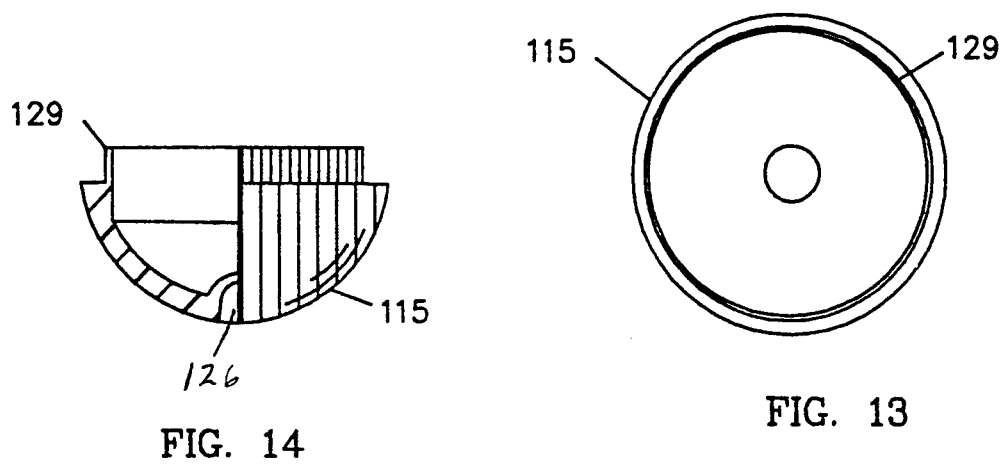
FIG. 14
FIG. 13

WATER GAUGE AND METHOD OF USE THEREFOR

BACKGROUND OF THE INVENTION

This invention relates to water gauges.

One class of water gauge includes a water collector with a float that moves to indicate the amount of water that has been applied, such as by rain or any other method. In one type of water gauge of this class, the water level is continuously indicated by the position of the float with respect to indicia. This type of gauge has several disadvantages, such as: (1) they are difficult to read; (2) they are not decorative; (3) they are readily breakable; and (4) they do not provide a sufficiently distinctive signal when a preset amount of water has been applied.

SUMMARY OF THE INVENTION

Accordingly, it is an object of the invention to provide a novel apparatus and technique for measuring liquid amounts.

It is a further object to provide a liquid gauge that provides an indication only when the liquid reaches a predetermined amount.

It is a still further object of the invention to provide a liquid level indicator which is activated by weight to provide an indication only after a preset amount of water has fallen on a lawn.

It is a still further object of the invention to provide a water gauge which includes a rotatable indicator supported by a base having a container to collect water falling therein.

It is an object of the invention to provide a water gauge that includes a container to collect water droplets, which container is supported by a base for a lawn and includes within it a rotatable spherical indicator ball.

In accordance with the above and further objects of the invention, a liquid gauge includes a means for collecting liquid and a means for providing a distinctive indication when the liquid reaches a predetermined amount. In the preferred embodiment, the amount of liquid is one inch or two inches. Advantageously, the indicator is weight activated, and in one embodiment, released by the liquid level and rotatable by weight. However, the indication can be provided by other means such as by a lever with an indicator on one end and a container on the other so as to lift the indicator when a predetermined amount of water is applied.

In the preferred embodiment, the indicator is a rotatable spherical indicator ball having a yellow hemispherical surface wall and a red hemispherical surface wall connected along a circumference, wherein the weight of the yellow hemispherical wall is greater than the red hemispherical wall. The indicator ball: (1) is supported by a base having a container with a post extending from the bottom thereof into an opening in the lower weight portion of the indicator ball; (2) is adapted to float so that its channel is moved above the top of the post with the addition of the predetermined amount of water to the container; and (3) rotates to position an initial signal hermispherical wall in the water and a final signal hemispherical wall above the water upon release by the post.

The water gauge includes a base and a spherical indicator ball. The base includes a container having a side wall, a bottom wall and a post. The spherical indicator ball has a yellow initial signal hemispherical wall and a red final signal hemispherical wall connected to an axle along a circumference. The axle is supported by the side wall of the container. The yellow initial signal hemispherical wall is heavier than the red final signal hemispherical wall. The spherical indicator ball has a channel in the middle of the red final signal hemispherical wall. Initially, the post is positioned into the channel so that the yellow initial signal hemispherical wall is up and visible.

To permit rotation of the indicator ball, axle members: (1) are connected to the indicator ball at the circumference; (2) are positioned along a central horizontal axle axis extending through the indicator ball, intersecting the outer circumference; and (3) support the indicator ball in the container. The thickness and weight of the yellow initial signal side are greater than the thickness and weight of the red final signal side which has the channel therein. The channel has a vertical channel axis extending through the indicator ball that intersects the horizontal axle axis at a right angle.

Guide channels in the container wall allow the indicator ball to move upward along the vertical channel axis within the container. The container includes a cylindrical side wall, a bottom wall and a post, and the post is positioned in the channel of the indicator ball. The water gauge is adapted to indicate when water droplets falling onto a lawn have reached a predetermined amount.

In use, the water gauge is positioned on a lawn to be watered. When watering has added a sufficient amount of water to the container to float the ball above the top of the post, the ball is rotated by gravitational force to position the heavier hemispherical wall in the water. Thus, the water gauge is adapted to indicate when water droplets falling onto a lawn have reached a predetermined amount.

As the indicator ball floats upward, the channel opening travels along the vertical axis and to the top of the post. The indicator ball then rotates to position the initial signal side in the water and the final signal side above the water. This informs the person controlling the sprinkler that sufficient water has been applied and the sprinkler is turned off or moved to a new location.

SUMMARY OF THE DRAWINGS

The above objects and further features of the invention will be better understood from the following detailed description when considered in connection with the accompanying drawings in which:

FIG. 10 is a partial cross-sectional side view of a ball in a water gauge container mounted in a base to be positioned on a lawn for receiving water in accordance with the invention.

FIG. 11 is a partial cross-sectional side view of the heavier hemispherical side of a ball for a water gauge in accordance with the invention.

FIG. 12 is a cross-sectional bottom view of the heavier hemispherical side of a ball for a water gauge in accordance with the invention.

FIG. 13 is a cross-sectional bottom view of the lighter hemispherical side of a ball for a water gauge in accordance with the invention.

FIG. 14 is a partial cross-sectional side view of the lighter hemispherical side of a ball for a water gauge in accordance with the invention.

DETAILED DESCRIPTION

Figure 1:
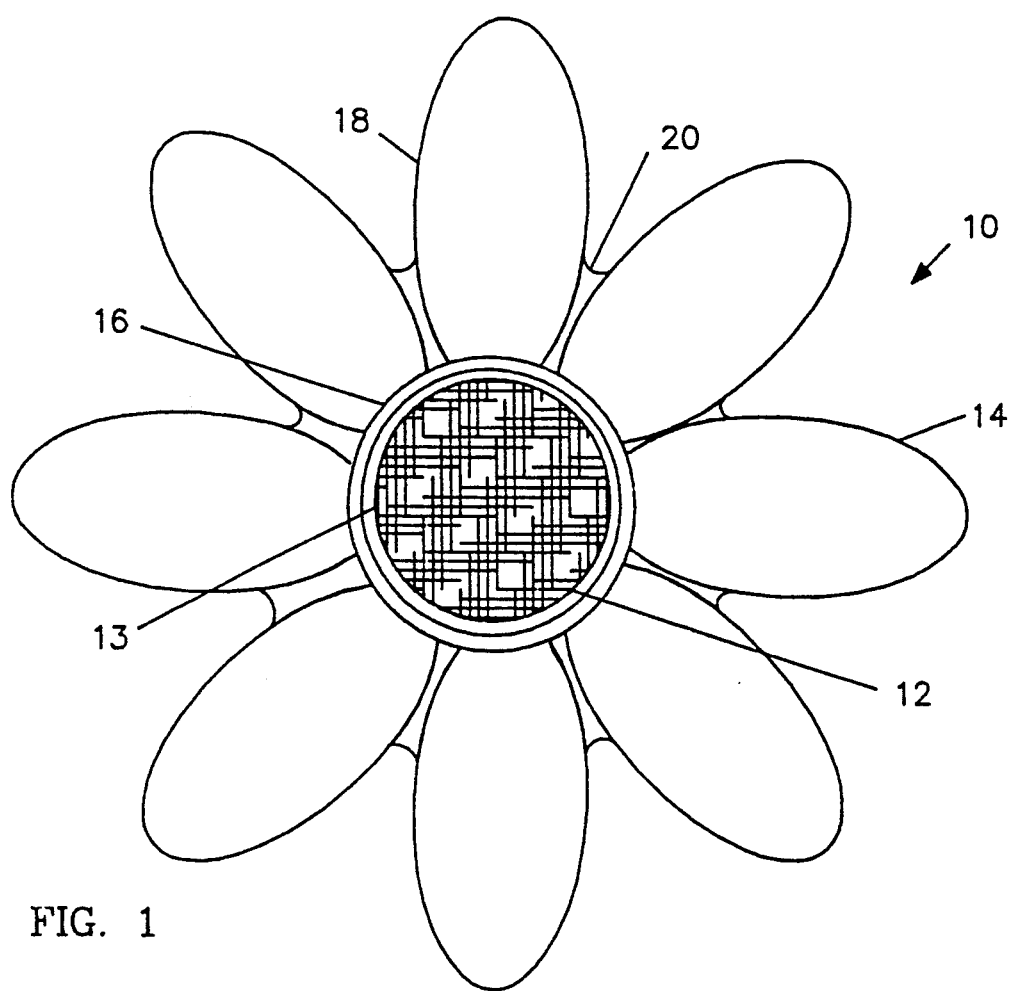
FIG. 1 is a top view of a water gauge in accordance with the invention.
Figure 2:
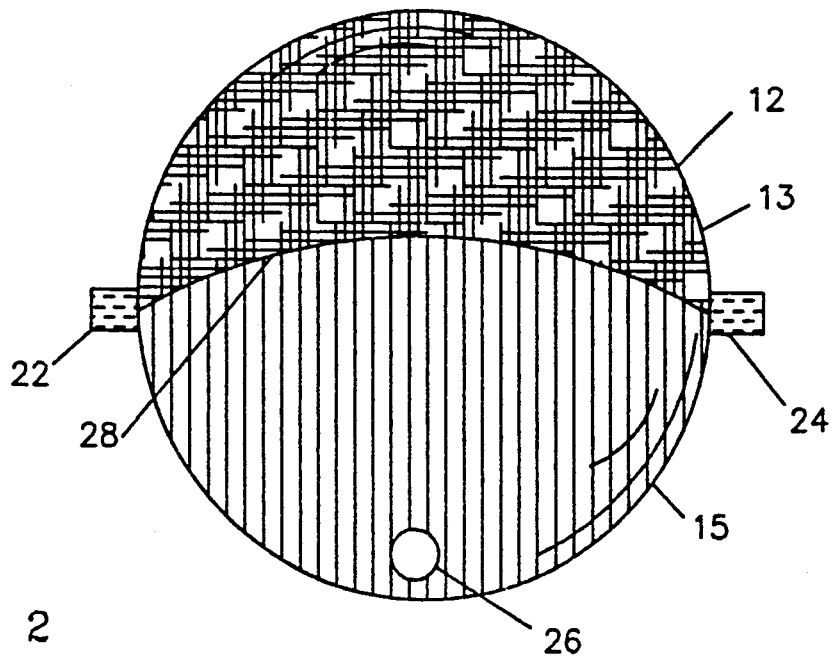
FIG. 2 is a perspective view of a ball for a water gauge in accordance with the invention.

In FIGS. 1 and 2, there is shown a water gauge 10, a spherical indicator ball 12 and a base 14. The indicator ball 12 includes a yellow hemispherical wall 13 and a red hemispherical wall 15. The base 14 includes a collar 16, arms 18 and connecting members 20. Axle members 22 and 24 are connected to the indicator ball 12 at circumference 28. The yellow hemispherical wall 13 and red hemispherical wall 15 are connected along circumference 28.

The indicator ball 12 is adapted to float in water and for this purpose has an average specific density lower than 1. The thickness and weight of the yellow hemispherical wall 13 are greater than the thickness and weight of the red hemispherical wall 15 and the red hemispherical wall 15 has an opening 26 therein.

Figure 3:
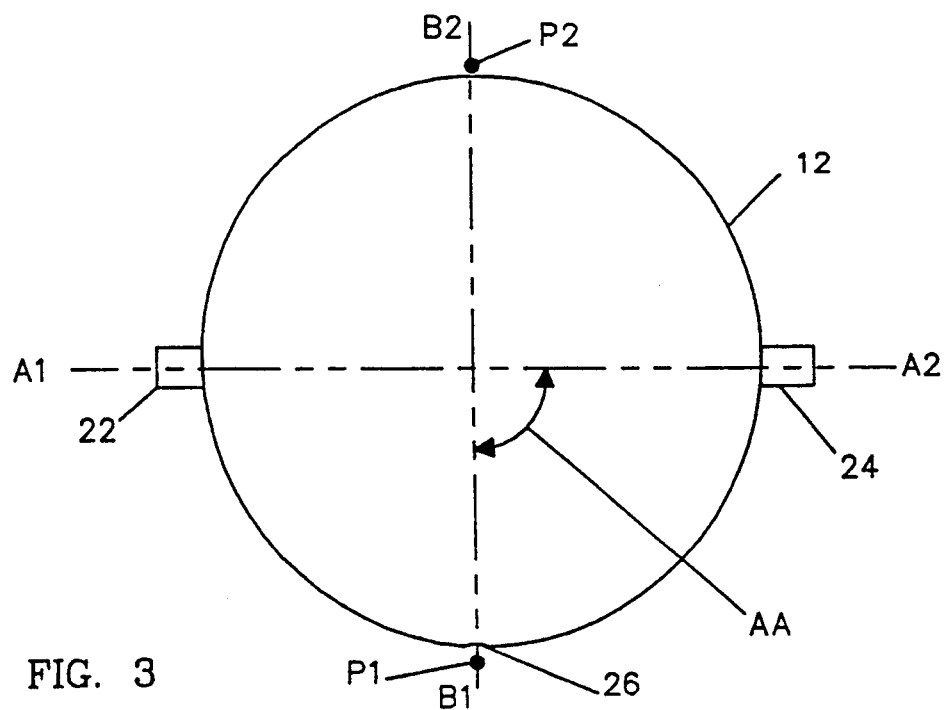
FIG. 3 is a schematic side view of a ball for a water gauge in accordance with the invention.

In FIG. 3, there is shown the axle members 22 and 24, positioned along a central horizontal axle axis A1-A2 extending through the indicator ball 12 and intersecting the outer circumference 28 (FIG. 2). The spherical indicator ball 12 has a vertical diameter extending between points P1 and P2 along vertical axis B1-B2. The horizontal axle axis A1-A2 and the vertical channel axis B1-B2 intersect at a right angle AA. The spherical indicator ball 12 has a vertical diameter extending between points P1 and P2 along vertical axis B1-B2. Initially, channel opening 26 is positioned adjacent to point P1.

Figure 4:
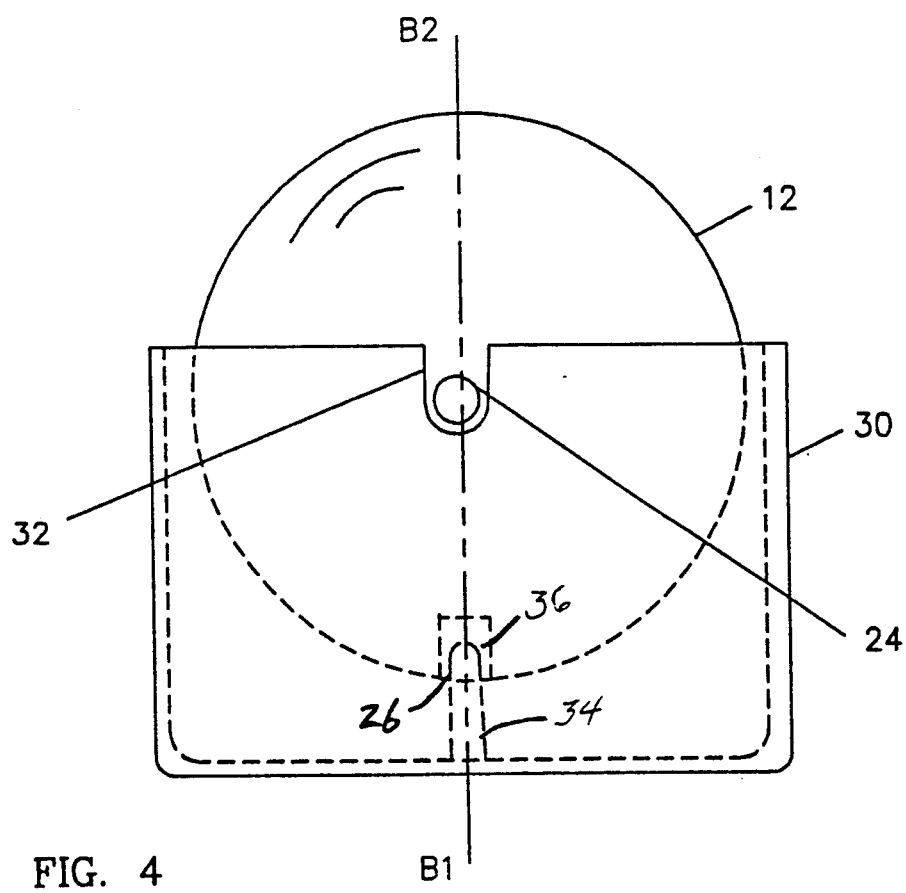
FIG. 4 is a side view of a ball in a water gauge container in accordance with the invention.

In FIG. 4, there is shown the indicator ball 12 supported in a container 30 by guide channel 32 which allows indicator ball 12 to move along vertical axis B1-B2. Container 30 includes a cylindrical side wall, a bottom wall and a post 34. The post 34 is positioned into the channel opening 26 (FIGS. 2 and 3).

Figure 5:
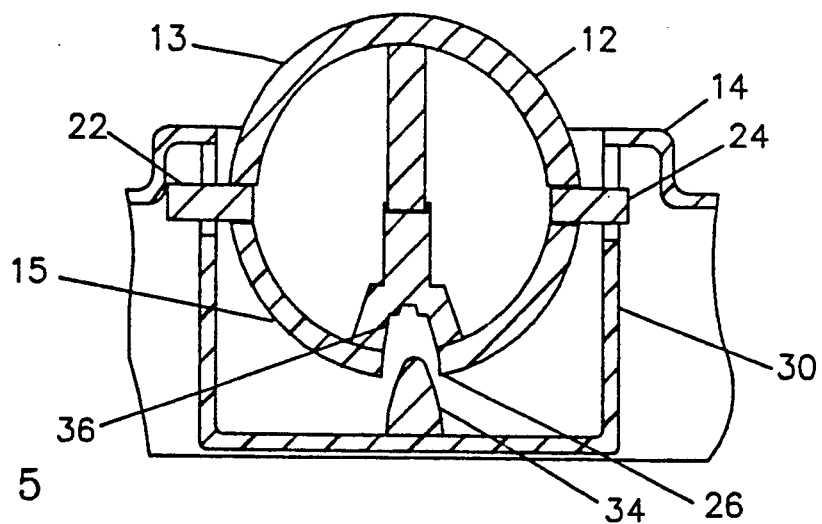
FIG. 5 is a partial cross-sectional side view of a ball in a water gauge container in position to receive water in accordance with the invention.
Figure 6:
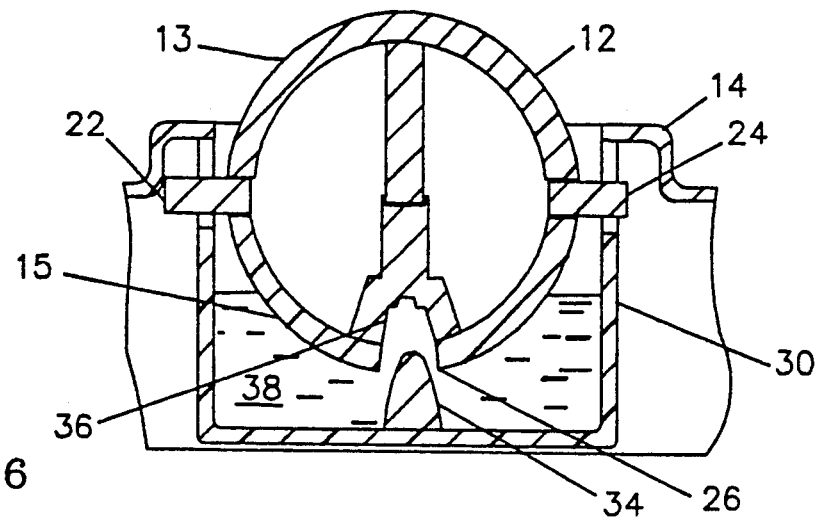
FIG. 6 is a partial cross-sectional side view of a ball in a water gauge container while receiving water in accordance with the invention.
Figure 7:
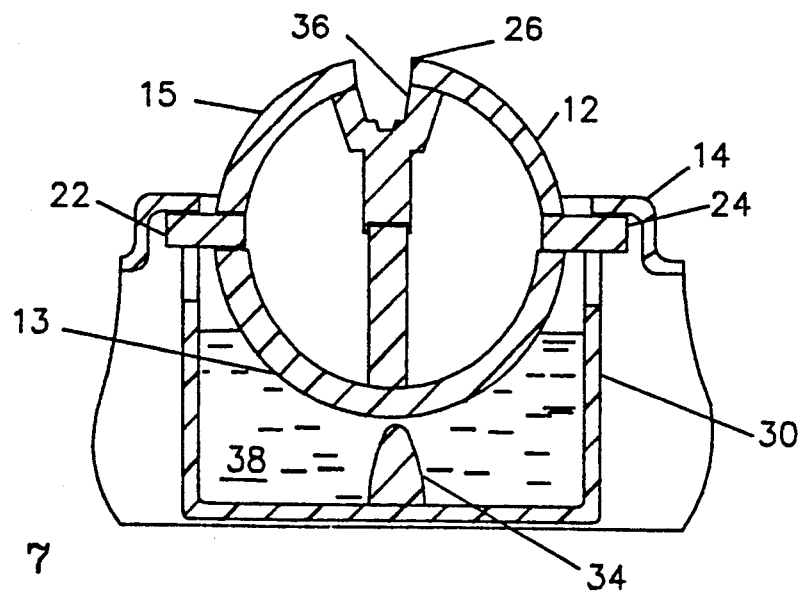
FIG. 7 is a partial cross-sectional side view of a ball in a water gauge container after having received a predetermined amount of water in accordance with the invention.

In FIGS. 5-7, there is shown axle members 22 and 24, supporting indicator ball 12 in container 30, which container 30 is connected to collar 14. The axle members 22 and 24 are adapted to support the spherical ball 12 as the channel 36 is rotated by gravitational force between points P1 and P2 (shown in FIG. 3) when the channel opening 26 is above the top of the post 34. The yellow hemispherical wall 13 acts as an initial signal and the red hemispherical wall 15 acts as a final signal. The positions of the indicator ball 12 before, during and after a predetermined amount of water 38 is added to the container 30 are shown in FIGS. 5-7. The predetermined amount of water is sufficient to float indicator ball 12 above the top of the post 34.

Figure 8:
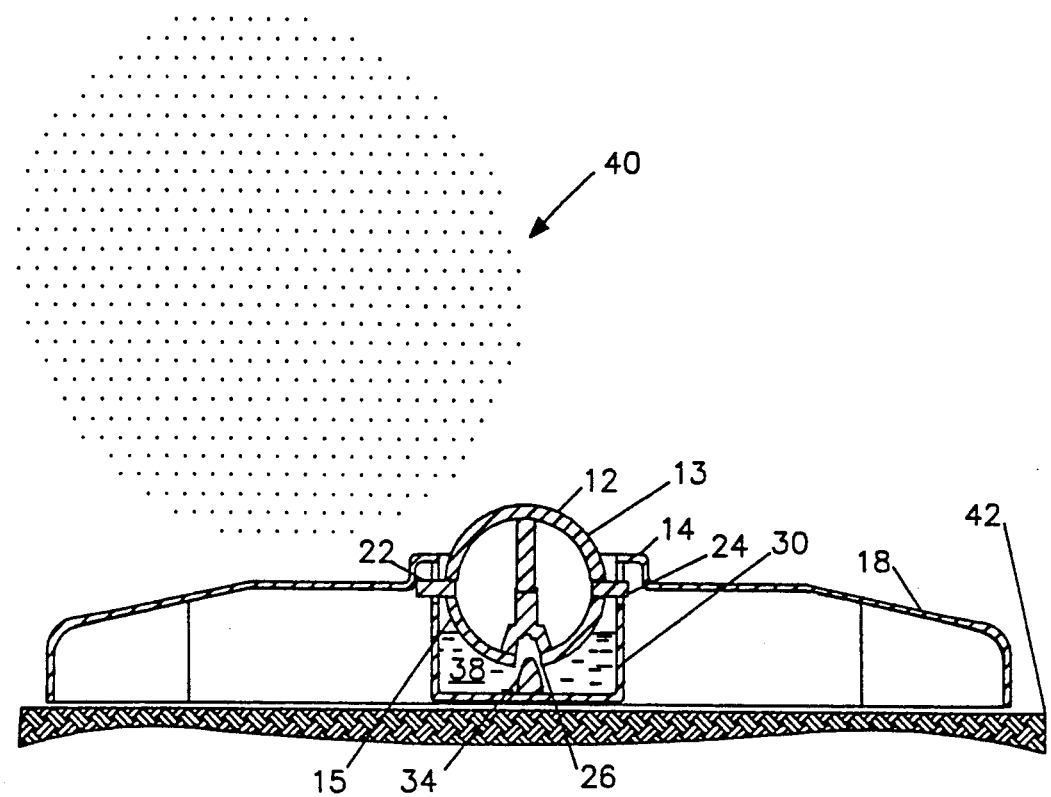
FIG. 8 is a cross-sectional side view of a ball in a water gauge container mounted in a base positioned on a lawn while receiving water in accordance with the invention.
Figure 9:
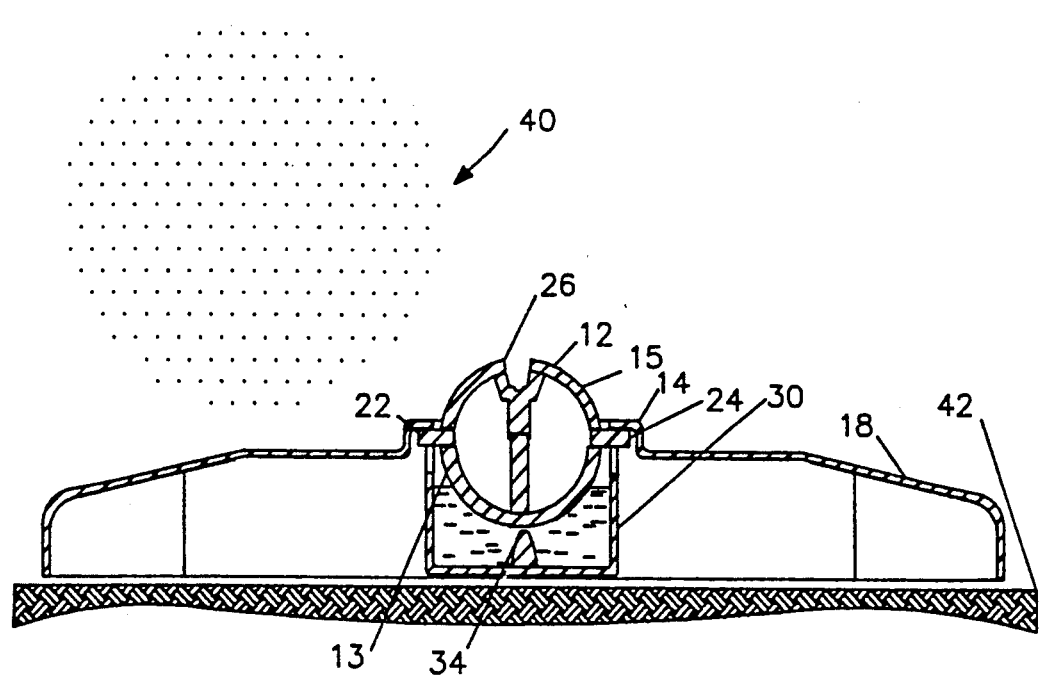
FIG. 9 is a cross-sectional side view of a ball in a water gauge container mounted in a base positioned on a lawn as it appears after having received a predetermined amount of water in accordance with the invention.

As the indicator ball 12 floats upward, the channel 36 travels along vertical axis B1-B2 (FIGS. 3 and 4) and off the top of post 34. The indicator ball 12 then rotates to position the yellow hemispherical wall 13 in the water 38 and the red hemispherical wall 15 above the water 38. This makes the red hemispherical wall 15 readily visible and is an indication that the predetermined amount of water has fallen into container 30. Thus, as shown in FIGS. 8 and 9, the water gauge is adapted to indicate when water droplets 40 falling onto lawn 42 has reached a predetermined amount.

All of the parts of water gauges in accordance with the invention, such as the water gauge 10, are preferably made of plastic material, such as polystyrene or polypropylene. The yellow hemispherical wall 13 and the red hemispherical wall 15 are preferably molded separately using colored polymer and then sealed together, for example by gluing or melting to form the watertight spherical ball 12.

Figure 15:
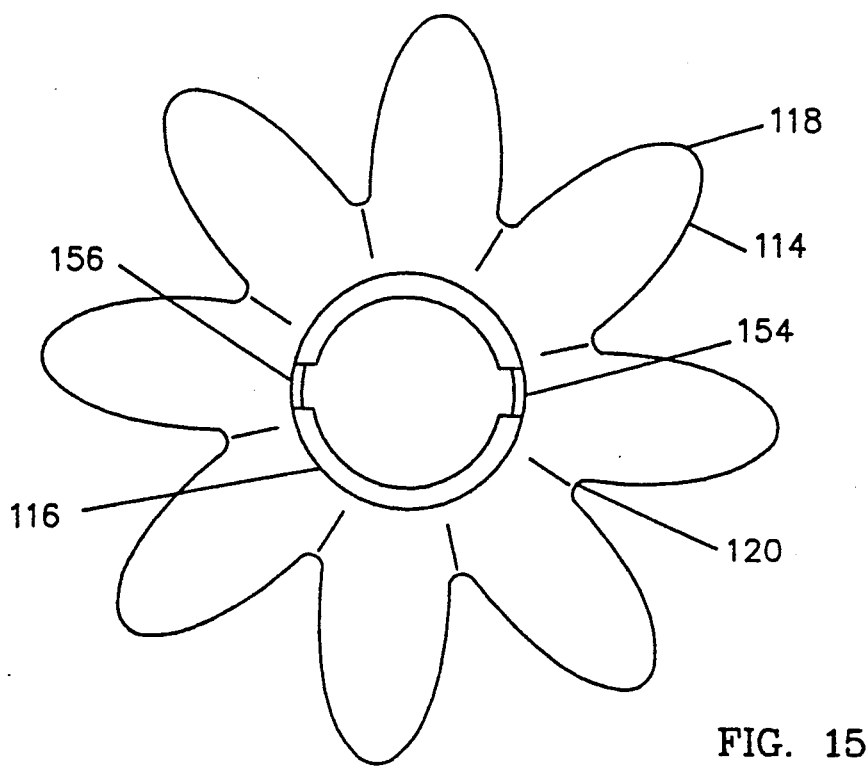
FIG. 15 is a top view of a preferred embodiment of a decorative base for a water gauge in accordance with the invention.

Another embodiment of the invention is shown in FIGS. 10-19. In the embodiment of FIG. 10, the water gauge 110 includes a spherical indicator ball 112 supported by a base 114. Base 114 includes a collar 116, arms 118 (FIG. 15) and connecting members 120 (FIG. 15). Collar 116 has a flange 121 which extends laterally.

As best shown in FIGS. 11-14, the indicator ball 112 has a yellow hemispherical wall 113 and a red hemispherical wall 115. The axle members 122 and 124 are connected to the yellow hemispherical wall 113 of indicator ball 112 at bottom wall 127 of yellow hemispherical wall 113. In the assembled indicator ball 112, the yellow hemispherical wall 113 and the red hemispherical wall 115 are connected along circumference 128 and the red hemispherical wall 115 has a flange 129. The bottom wall 127 and the flange 129 are positioned to connect hemispherical walls 113 and 115, forming a watertight seal. Channel opening 126 (FIG. 10) receives post 134 (FIG. 10) extending from the bottom of container 130 into channel 136 (FIG. 10).

A metal washer 150 is connected to a member 152, which member is in turn connected to the yellow hemispherical wall 113. The combined weight of the metal washer 150 and the yellow hemispherical wall 113 are greater than the weight of the red hemispherical wall 115. The red hemispherical wall 115 has channel opening 126 therein.

Figure 16:
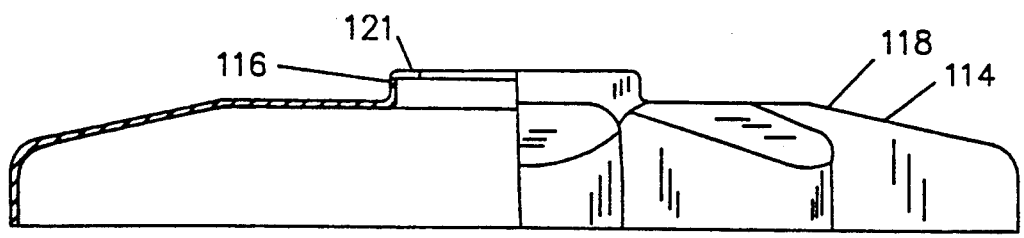
FIG. 16 is a partial cross-sectional side view of the decorative base shown in FIG. 15 for a water gauge in accordance with the invention.

FIGS. 15 and 16 show top and partial cross-sectional side views of a decorative base 114 for water gauge 110 which decorative base 114 has the form of a daisy. The decorative base 114 includes a collar 116, arms 118 and connecting members 120.

Figures 17, 18:
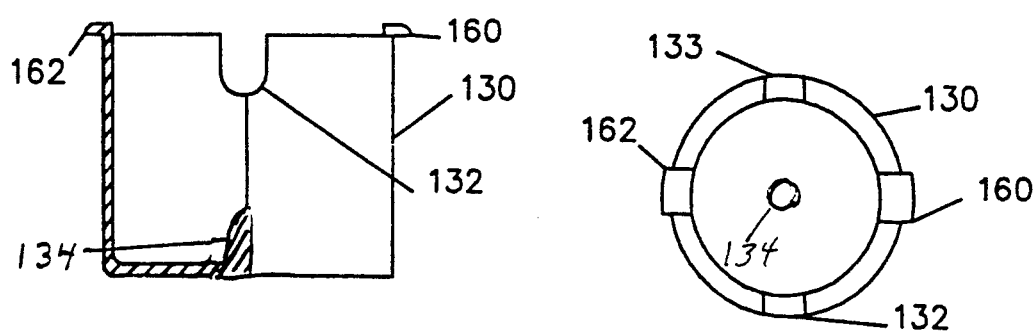
FIG. 17 is a top view of a container to support a ball and collect water for a water gauge in accordance with the invention.
FIG. 18 is a partial cross-sectional side view of the container to support a ball and collect water for a water gauge in accordance with the invention shown in FIG. 17.

FIGS. 17 and 18 show top partial cross-sectional side views of container 130 to support ball 112 and collect water for water gauge 110. Axle members 122 (FIG. 11) and 124 (FIG. 11) are adapted to support the spherical ball 112 on guide channels 132 and 133. The top of container 130 is adapted to be affixed to flange 121 as shown in FIG. 10. Collar 116 (FIG. 15) has collar channels 154 and 156 (FIG. 15). Container 130 has container flanges 160 and 162 which are connected to collar channels 154 and 156 (FIG. 15) respectively.

Axle members 122 (FIG. 11) and 124 (FIG. 12) are adapted to support the spherical ball 112 as it is rotated by gravitational force when the channel opening 126 is above the top of the post 134 (FIG. 10). The yellow hemispherical wall 113 acts as an initial signal and the red hemispherical wall 115 acts as a final signal. A predetermined amount of water is sufficient to float indicator ball 112 above the top of the post 134. As the indicator ball 112 floats upward, the channel 136 travels along a vertical axis and off the top of the post 134. The indicator ball 112 then rotates to position the yellow hemispherical wall 113 in the water and the red hemispherical wall 115 above the water. This makes the red hemispherical wall 115 readily visible and is an indication that the predetermined amount of water has fallen into the container 130.

Figure 19:
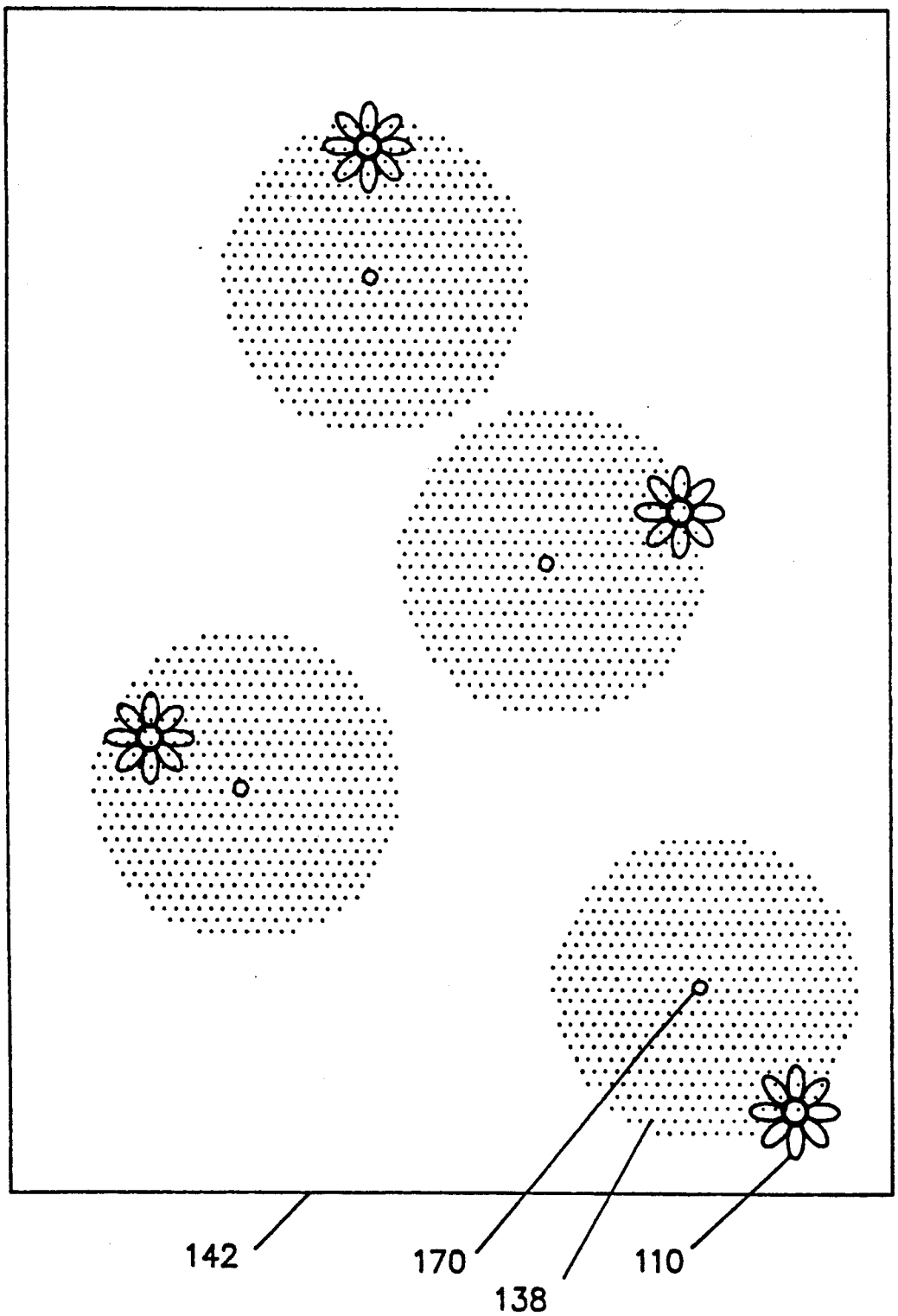
FIG. 19 is a top view of water gauges collecting water on a lawn in accordance with the invention.

FIG. 19 is a top view of water gauges 110 on a lawn 142 collecting water droplets 138 from sprinklers 170. Each of the water gauges 110 has a decorative body which has the form of a daisy. Water gauges 110 are made of plastic which is not readily breakable.

In a preferred embodiment of the invention, a water gauge is adapted to indicate when a lawn has received one inch of water. In another preferred embodiment of the invention, a water gauge is adapted to indicate when a lawn has received two inches of water.

In using the water gauge for the measurement of water, one or more water gauges 10 and/or 110 are positioned on a surface to be watered, such as a lawn or a golf green. As described above, the water gauge includes a ball having an initial (yellow) and final (red) indicator hemispherical walls supported on an axle above a container. The initial indicator side has greater weight than the final indicator side.

At the beginning of the watering, the final indicator side is positioned in the container so that it is not readily visible. A channel in the final indicator side is positioned over a post extending from the bottom of the container.

As a sufficient amount of water is added to the container to float the ball above the top of the post, the ball rotates making the final indicator side readily visible by positioning it above the container. This moves the initial indicator side into the container and out of sight. When the appearance of the final indicators being positioned above the containers indicates that the water gauges have been filled and that watering is complete, the operator turns off or repositions the watering system. The filled water gauges are emptied and reset by repositioning the channel in the final indicator side over a post extending from the bottom of the container. The reset water gauges may be reused at the same or a different location.

While the present invention has been disclosed in connection with the preferred embodiment thereof, it should be understood that there may be other embodiments which fall within the spirit and scope of the invention as defined by the appended claims.

What is claimed is:

1. A liquid gauge comprising:
   means for collecting liquid; and
   means for providing a distinctive indication only after the liquid reaches a predetermined amount;
   said means for collecting liquid including a base and a container;
   said base supporting said container and said container having an open top for receiving liquid falling downward from a level above it;
   guide means for permitting said means for providing a distinctive indication to move vertically at least a predetermined distance while restraining said means for providing a distinctive indication from moving horizontally and from rotating about a vertical axis;
   said guide means including connecting means for movably connecting said means for collecting liquid and said means for providing a distinctive indication;
   means for preventing rotation about a horizontal axis until after said means for providing a distinctive indication has moved upwardly said predetermined distance;
   said means for providing a distinctive indication being connected to said means for collecting liquid so as to be floated upwardly with respect to said base to provide said distinctive indication in response to said container receiving said predetermined amount of liquid.

2. A liquid gauge according to claim 1 in which said means for giving a distinctive indication is weight activated.

3. A liquid gauge according to claim 1 in which the means for providing a distinctive indication is a rotatable spherical indicator ball having two distinctive portions; one of said portions indicating that the predetermined amount of liquid has been received.

4. A liquid gauge according to claim 3 in which one of said two distinctive portions has a yellow hemispherical surface wall and the other a red hemispherical surface wall connected along a circumference, wherein the weight of the yellow hemispherical wall is greater than the weight of the red hemispherical wall.

5. A water gauge, comprising:
   a base; and
   a ball;
   said base comprising a container having a side wall, a bottom wall and a post;
   said ball comprising a spherical member and axle means; said spherical member having a channel therein and being connected to said axle means for rotation of the channel while the spherical member is supported by the axle means; said axle means being movably supported by said side wall; said post being connected to said bottom wall and having a post top; said post being positioned into said channel wherein the ball is adapted to float so that its channel is moved above the top of the post and released upon said container receiving a predetermined amount of water and means responsive to the force of gravity for causing said ball to rotate after the channel is released from the top of said post;
   guide means connecting said side wall and said axle means for permitting said axle means to be vertically movable in said side wall, wherein said ball may move vertically but is restrained from rotating about a vertical axis;

said spherical member including means for indicating when said spherical member has rotated, whereby an indication is provided that the container has received said predetermined amount of water.

6. A water gauge according to claim 5, wherein said spherical member comprises an initial indicator hemispherical wall having an outer surface and a final indicator hemispherical wall having an outer surface; and said initial indicator hemispherical wall and said final indicator hemispherical wall being connected along a circumference of said spherical member.

7. A water gauge according to claim 6, wherein said spherical member has a vertical diameter extending between a first and a second point along the vertical axis; and said channel has a central channel axis extending along said vertical axis.

8. A water gauge according to claim 7, wherein said channel has a channel opening in said final indicator hemispherical wall; and said axle means is adapted to support said spherical member as said channel is rotated between said first point and said second point when said channel opening is above said top of said post.

9. A water gauge according to claim 8, wherein said spherical member is adapted to rotate around a horizontal axis; and said horizontal axis and said vertical axis intersect at a right angle.

10. A water gauge according to claim 6, wherein said initial indicator hemispherical wall is thicker than said final indicator hemispherical wall and thereby function as said means for causing said ball to rotate.

11. A water gauge according to claim 10, wherein said channel intersects said outer surface of said final indicator hemispherical wall.

12. A water gauge according to claim 11, wherein said outer surface of said initial indicator hemispherical wall is yellow and said outer surface of said final indicator hemispherical wall is red.

13. A water gauge according to claim 12, wherein said base further comprises a collar and a plurality of arm members extending radially from said collar, and said side wall of said container is connected to said collar.

14. A method of determining when a lawn has been sufficiently watered, comprising the steps of:

positioning a water gauge at a predetermined location on a lawn to be watered and watering the lawn at that location, wherein the water gauge collects water;

providing a distinctive signal with the water gauge only when a predetermined amount of water has been applied to that location on the lawn; and terminating the watering of that location upon receiving the signal;

the step of providing a distinctive signal including the step of causing a ball to float in response to water received during the watering process, wherein said ball has one hemispherical wall that is heavier than a second hemispherical wall, and to rotate about a horizontal axis by gravitational force to position the heavier hemispherical wall in the water while preventing it from rotating about a vertical axis.

* * * * *